(12) United States Patent
Lee et al.

(10) Patent No.: US 7,769,589 B2
(45) Date of Patent: Aug. 3, 2010

(54) SYSTEM AND METHOD FOR PROVIDING ELECTRONIC PROGRAM GUIDE

(75) Inventors: Bong-Ho Lee, Daejeon (KR); Hyun Lee, Daejeon (KR); Soo-In Lee, Daejeon (KR); Chieteuk Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1035 days.

(21) Appl. No.: 10/530,974

(22) PCT Filed: Apr. 24, 2003

(86) PCT No.: PCT/KR03/00833

§ 371 (c)(1),
(2), (4) Date: Mar. 13, 2006

(87) PCT Pub. No.: WO2004/034177

PCT Pub. Date: Apr. 22, 2004

(65) Prior Publication Data

US 2006/0161425 A1 Jul. 20, 2006

(30) Foreign Application Priority Data

Oct. 11, 2002 (KR) ............ 10-2002-0062051

(51) Int. Cl.
*G10L 13/00* (2006.01)
(52) U.S. Cl. ............ 704/258; 704/260; 725/39; 725/46
(58) Field of Classification Search ............ 704/258, 704/260; 725/39, 46
See application file for complete search history.

(56) References Cited

U.S. PATENT DOCUMENTS

| 5,737,030 | A | * | 4/1998 | Hong et al. | ............ 725/41 |
| 5,774,859 | A | * | 6/1998 | Houser et al. | ............ 704/275 |
| 6,314,398 | B1 | | 11/2001 | Junqua et al. | |
| 6,407,779 | B1 | | 6/2002 | Herz | |

(Continued)

FOREIGN PATENT DOCUMENTS

CN 1237308 A 12/1999

(Continued)

OTHER PUBLICATIONS

"Web Accessibility for People With Disabilities: An Introduction for Web Developers" by Jeff Carter, et al.; *IEEE Transactions on Professional Communication*, vol. 44, No. 4; Dec. 2001; pp. 1-9.

(Continued)

*Primary Examiner*—Daniel D Abebe
(74) *Attorney, Agent, or Firm*—Blakely, Sokoloff, Taylor & Zafman LLP (57) ABSTRACT

Disclosed is a system for providing an electronic program guide and a method of providing the same, the electronic program guide (EPG) being about a plurality of programs supplied through a digital broadcasting system, including the steps of receiving service information transmitted from the digital broadcasting system, and extracting the EPG information from the service information to store the EPG information; analyzing a user's request and extracting EPG information that meets the user's request from the stored EPG information to produce tailored EPG information; converting the tailored EPG information into speech EPG information; and reproducing the speech EPG information as speech to provide users with the EPG information.

10 Claims, 7 Drawing Sheets

U.S. PATENT DOCUMENTS

| | | | |
|---|---|---|---|
| 2001/0042247 A1* | 11/2001 | Inoue | 725/1 |
| 2002/0052746 A1* | 5/2002 | Handelman | 704/270 |
| 2002/0120451 A1* | 8/2002 | Kato et al. | 704/258 |
| 2003/0051246 A1* | 3/2003 | Wilder et al. | 725/49 |
| 2003/0105639 A1* | 6/2003 | Naimpally et al. | 704/276 |
| 2003/0149981 A1* | 8/2003 | Finster et al. | 725/46 |
| 2003/0184578 A1* | 10/2003 | Cowperthwaite | 345/721 |
| 2004/0078820 A1* | 4/2004 | Nickum | 725/58 |
| 2004/0168187 A1 | 8/2004 | Chang | |
| 2005/0283796 A1* | 12/2005 | Flickinger | 725/35 |
| 2008/0184303 A1* | 7/2008 | Schein et al. | 725/40 |
| 2008/0189744 A1* | 8/2008 | Schein et al. | 725/40 |

FOREIGN PATENT DOCUMENTS

| | | |
|---|---|---|
| EP | 1189151 A2 | 2/2001 |
| JP | 2000-324417 | 11/2000 |
| KR | 10-1997-0024868 A | 5/1997 |
| KR | 1999-001807 | 1/1999 |
| KR | 10-2000-0053475 A | 8/2000 |
| WO | WO 98/16062 | 4/1998 |

OTHER PUBLICATIONS

Michael Ehrmantraut, et al, 'The personal electronic program guide-towards the pre-selection of individual TV programs' AMC, 5, CIKM, pp. 243-250, 1996.

Difino A, Negro B., Chiarotta A (2002) A multi-agent system for a personalized electronic program guide. In: Proceedings of the 2nd workshop on personalization in future TV, Malaga, May 29-31, 2002.

* cited by examiner

SYSTEM AND METHOD FOR PROVIDING ELECTRONIC PROGRAM GUIDE

The present patent application is a non-provisional application of International Application No. PCT/KR2003/000833, filed Apr. 24, 2003.

BACKGROUND OF THE INVENTION (a) Field of the Invention

The present invention relates to a system for providing an electronic program guide, and a method of providing the same. More particularly, the present invention relates to a system for providing an electronic program guide in a digital broadcasting receiving system, and a method of providing the same.

(b) Description of the Related Art

Since a plurality of channels may be allocated to one frequency band in digital broadcasting practice while analog broadcasting has only one channel allocated to one frequency band, it is very easy to form multiple channels in digital broadcasting. Demands by viewers who want to easily know what programs are supplied through each channel have greatly increased as multi-channel broadcasting has become generalized. Accordingly, presently-used digital broadcasting receivers now provide an electronic program guide (EPG) to give viewers program information. This EPG is now executed in various broadcasting receivers such as broadcasting via satellite, digital terrestrial broadcasting, digital-audio broadcasting, mobile multi-media broadcasting receivers, etc.

According to a conventional EPG-providing method, program data supplied from a broadcasting station are processed to generate an EPG, and this EPG information is then displayed by using a graphic engine so that a viewer may visually confirm the program information. Such a conventional EPG-providing method has been disclosed in Korean Patent Application No. 2000-1479. However, this conventional EPG-supplying method is not a help to the blind people or other users who are moving or driving in cars.

SUMMARY OF THE INVENTION

It is an advantage of the present invention to provide a speech EPG to allow viewers to check desired information more conveniently and effectively.

It is another advantage of the present invention to provide a system and method for providing an electronic program guide, which converts EPG information including text and data into spoken text for speech presentation and gives users a tailored EPG service that meets users' requests and preferences.

In order to achieve the above objects, the present invention provides a system for providing an electronic program guide (EPG) about a plurality of programs supplied through a digital broadcasting system.

The inventive system includes a service information receiver unit receiving service information transmitted from the digital broadcasting system and extracting the EPG information from the service information, and storing the EPG information, an EPG processor converting the EPG information stored in the service information receiver unit into speech EPG information, and a speech output unit producing the speech EPG information in a voice.

The EPG processor converts the EPG information into characters and forms the same into sentences to produce the speech EPG information. The EPG processor converts the EPG information into colloquial sentences to produce the speech EPG information.

The inventive system further includes a user interface through which a user's request is input, and the EPG processor analyzes the request, extracts the information matched with request by the user from among the EPG information held in the service information receiver unit, and converts the extracted EPG information into speech EPG information.

The EPG processor performs speech recognition by analyzing a user speech signal applied through the user interface and converting the user speech signal into a signal recognizable and to be processed by the EPG processor.

The EPG processor includes a control and command processor extracting the information only that the user requests among the EPG information held in the service information receiver unit to produce tailored EPG information, a text converter converting the tailored EPG information into speech EPG information under the control of the control and command processor, and an interface providing a user's request, applied through the user interface devices, to the control and command processor.

The EPG processor classifies the EPG information into higher-order information and lower-order information, and respectively converts them into higher-order speech EPG information and lower-order speech EPG information, and outputs the higher-order speech EPG information to the speech output unit to reproduce the information as speech, and then selectively outputs the lower-order speech EPG information to the speech output unit in response to the user's request to reproduce the information as speech.

The service information receiver unit includes a tuner receiving a digital broadcasting signal transmitted from the digital broadcasting system, a demodulator demodulating the digital broadcasting signal applied from the tuner to extract a stream, a demultiplexer separating video, audio, data stream and service information contained in the stream from each other, an EPG generator generating EPG information from the separated service information, and a storage unit storing the EPG information.

A graphic output unit displays the EPG information processed by the EPG processor. The EPG processor links the EPG information output in a voice through the speech output unit to the EPG information displayed through the graphic output unit, and controls the speech output unit and the graphic output unit so that the EPG information may be produced as speech simultaneously while being displayed.

According to another aspect of the present invention, a method of providing an electronic program guide (EPG) in a system for providing the EPG about a plurality of programs supplied through a digital broadcasting system, includes: (a) receiving service information transmitted from the digital broadcasting system, and extracting the EPG information from the service information to store the EPG information; (b) analyzing a user's request and extracting EPG information that meets the user's request from the stored EPG information to produce tailored EPG information; (c) converting the tailored EPG information into speech EPG information; and (d) reproducing the speech EPG information in a voice to provide users with the EPG information.

The step (c) converts the tailored EPG information into characters and forms the same into sentences to produce the speech EPG information.

The step (c) forms the EPG information into colloquial sentences to produce the speech EPG information. The step (b) classifies the tailored EPG information into higher-order information and lower-order information, and the step (d)

converts the higher-order information and lower-order information into higher-order speech EPG information and lower-order speech EPG information, respectively, and narrates the higher-order speech EPG information and the lower-order speech EPG information, sequentially.

According to the present invention, a digital broadcasting receiver searches for EPG information from received and stored service information (SI) to convert the same into text and sentences, and provides speech EPG through a voice conversion.

In addition, the present invention supplies a personalized EPG service on the basis of a user's preference. The program information is classified by properties, genres and qualities, and the inventive system searches and guides the most appropriate program by comparing or matching analyzed data with profile data corresponding to the user's preference.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
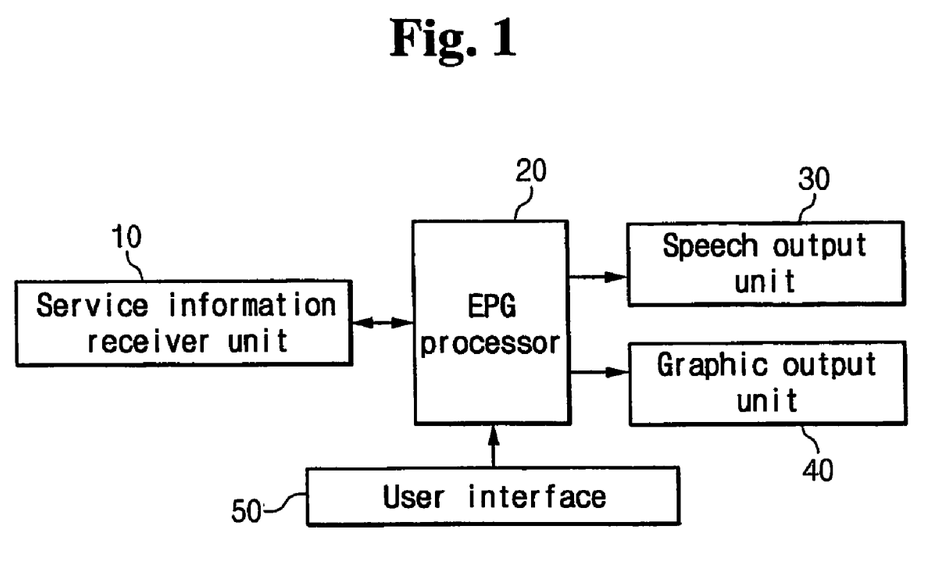
FIG. 1 is a schematic block diagram of a system for providing an electronic program guide (EPG) in accordance with a preferred embodiment of the present invention.
Figure 2:
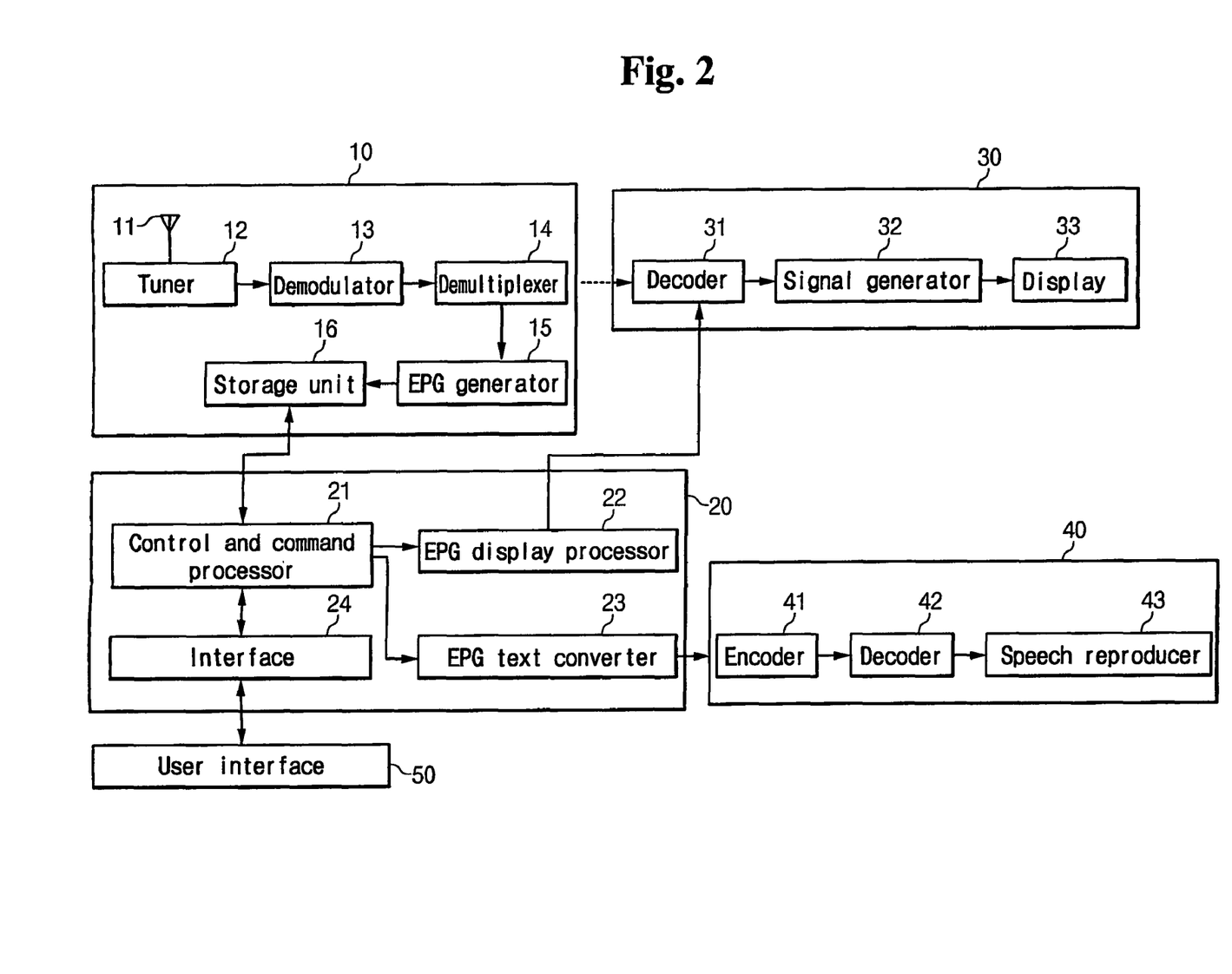
FIG. 2 is a detailed block diagram of the system of FIG. 1 for providing the EPG.

FIG. 1 is a schematic block diagram of a system for providing an electronic program guide (EPG) in accordance with a preferred embodiment of the present invention, and FIG. 2 is a detailed block diagram of the system of FIG. 1.

As shown in FIG. 1, the system for providing an electronic program guide (referred to as an EPG providing system hereinafter) according to the preferred embodiment of the present invention includes a service information receiver unit 10, an EPG processor 20, a graphic output unit 30, a speech output unit 40, and a user interface 50.

The service information receiver unit 10 receives and stores service information transmitted from a broadcasting station (not shown). As depicted in FIG. 2, the service information receiver unit 10 includes an antenna 11; a tuner 12 receiving digital broadcasting signals through the antenna 11; a demodulator 13 demodulating the digital broadcasting signals applied from the tuner 12 and extracting a stream from radio frequency (RF) signals, that is, the digital broadcasting signals; a demultiplexer 14 separating service information and video, audio, and data streams contained in the stream from each other; an EPG generator 15 generating EPG information from the separated service information; and a storage unit 16 storing the EPG information. In this instance, the demodulator 13 may operate through various demodulation methods including QAM(Quadrature Amplitude Modulation), QPSK(Quadrature Phase Shift Keying), and OFDM (Orthogonal Frequency Division Multiplexing).

The graphic output unit 30 either processes and displays the video and data streams received and processed by the service information receiver unit 10, or displays EPG information supplied from the EPG processor 20. As depicted in FIG. 2, the graphic output unit 30 may include a decoder 31 decoding the video and data stream applied from the service information receiver unit 10 or the EPG information applied from the EPG processor 20, a signal generator 32 producing display signals for digital broadcasting practice in response to the decoded signals, and a display 33 displaying a picture or text corresponding to the EPG information in response to the generated display signals.

The EPG processor 20, serving as an agent, automatically carries out a user-desired operation to output the EPG in the speech format as a substitute for a user. This EPG processor 20 is an intelligent device with a knowledge-based inference engine including a rule-based expert system that serves to convert the EPG information into characters and sentences, and an expert system for speech recognition.

The EPG processor 20 processes the EPG information stored by the service information receiver unit 10 to be produced as speech, and processes the EPG information to be visually displayed. In detail, as shown in FIG. 2, the EPG processor 20 includes a control and command processor 21 for performing intellectual control and management of the EPG information and carrying out a command; an EPG display processor 22 for processing the EPG information that is output from the service information into a format that may be displayed, and providing the EPG information to the graphic output unit 30; an EPG text converter 23 for converting the EPG information into characters, forming the information into sentences, and providing the same to the speech output unit 40; and an interface 24 for interfacing the user interface 50 and the control and command processor 21. In this instance, the EPG information converted into text and formed into a sentence may be referred to as "speech EPG information," which represents that the EPG information is output as speech.

The speech output unit 40 converts characters and sentences applied from the EPG processor 20 into a speech signal, and outputs it. This speech output unit 40 includes an encoder 41 for encoding applied data of characters and sentences, a decoder 42 for decoding the encoded data to a speech signal, and a speech reproducer 43 for reproducing the speech signal. The technique of reproducing the character and sentence data as speech is already known to the public, so a detailed description thereof is omitted.

A user interface 50 lets the EPG processor 20 carry out a user-desired operation, and all kinds of input units (e.g. remote controllers, keypads, keyboards, mouse, voice, touch pads, etc.) that are applicable to digital broadcasting receivers may serve as the user interface 50. A user's command applied through the user interface 50 is analyzed by the EPG processor 20 and carried out via a given device.

An operation of the EPG providing system will now be described.

Figure 3:
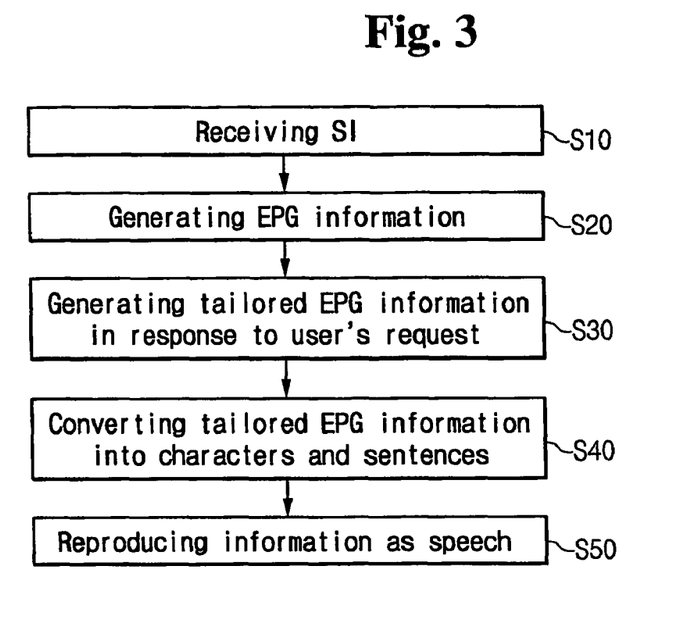
FIG. 3 depicts the overall control sequence of the system for providing the EPG in accordance with a preferred embodiment of the present invention.

FIG. 3 depicts the overall operation of the EPG providing system in accordance with a preferred embodiment of the present invention.

When service information is transmitted from a digital broadcasting transmission system (not shown), the service information receiver unit 10 receives and processes the service information to generate EPG information, and stores it (S10).

The EPG processor 20 selects information that meets a user's request applied through the user interface 50 from among the EPG information produced by the service information receiver unit 10, and produces tailored EPG information (S20 and S30).

The EPG processor 20 converts the tailored EPG information requested by the user into characters and sentences and provides the same to the speech output unit 40, and the speech output unit 40 accordingly reproduces the characters and sentences matched with the tailored EPG information as speech (S40 and S50). In addition, the tailored EPG information is selectively displayed through the graphic output unit 30.

The operation of each part of the EPG-providing system is more fully described below.

Figure 4:
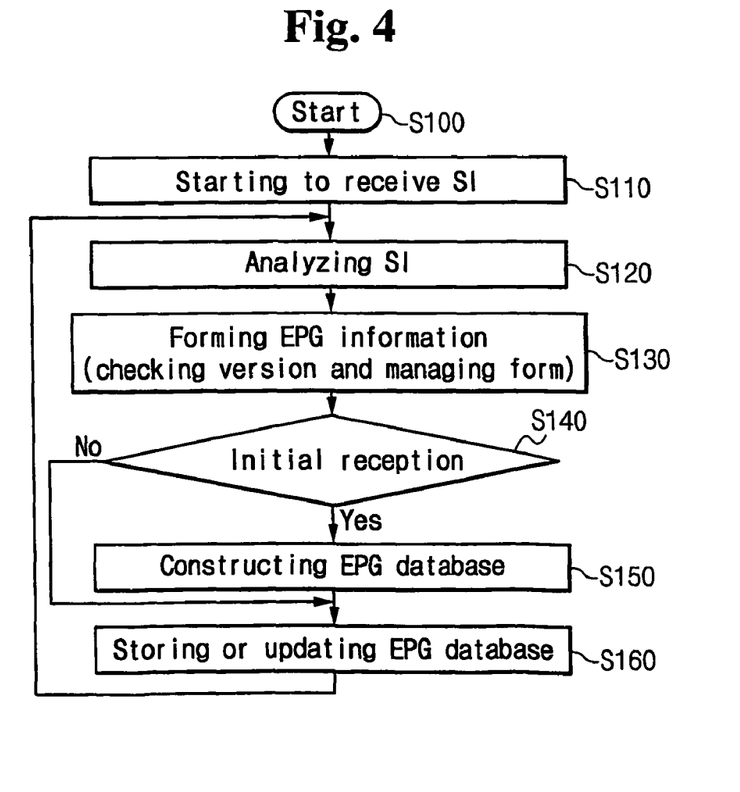
FIG. 4 depicts the control sequence of the service information receiver unit of FIG. 1.

FIG. 4 depicts the control sequence of the service information receiver unit according to the preferred embodiment of the present invention.

As shown in FIG. 1, the tuner 12 of the service information receiver unit 10 receives a digital broadcasting signal from a digital broadcasting transmission system (not shown) through the antenna 11, and the demodulator 13 demodulates the digital broadcasting signal and extracts stream information from an RF signal, that is, a digital broadcasting signal (S100 and S110).

As the standard for transmitting pictures and various data for digital television broadcasting, MPEG-2 (Motion Picture Experts Group-2) is generally used. In MPEG-2, various signals for moving pictures, sound, and additional service information are packeted to be bit streams. A transmitting part transmits data contained in a transport stream, and this transport stream contains broadcasting programs for digital broadcasting and broadcasting program guide information for each channel and for each period of time. In addition, audio broadcasting multiplexes video and multimedia data, on the audio service basis, to provide various multimedia services.

Eureka 147, the European digital audio broadcasting standard, provides service information for FIC channels. In digital audio broadcasting practice, program guide information for each channel and for each period of time about broadcasting programs is multiplexed and transmitted.

According to the present invention, the demultiplexer 14 separates video, audio, data stream, and service information contained in the stream information from each other. The EPG generator 15 analyzes the separated service information to produce the EPG information and checks the version of the produced EPG information and manages the form of the EPG information (S120 and S130).

In the step of managing the form of the information, the EPG generator 15 checks the version of the received service information, and if there is a change in the corresponding information, the EPG generator 15 updates it.

Here, "change" means an amendment in a field among the service information, and it may further mean deletion of the existing service or addition of a new service. To "update" means to amend, delete, or add a corresponding database or memory in response to the change.

The EPG generator 15 determines if the service information received is the initial reception thereof, and constructs a database for storing information if it is the initial reception, and then stores the information in a storage unit 16 (S140 and S150).

If the service information is not the initial reception thereof, the EPG generator 15 stores new EPG information only in the storage unit 16 and updates the data to be amended (S160).

The service information receiver unit 10 periodically receives the transmitted service information and updates the EPG information, thus managing the version of the EPG information.

As described above, once the service information receiver unit 10 receives the service information and stores the EPG information, the EPG processor 20 reproduces the EPG information as follows.

Figure 5:
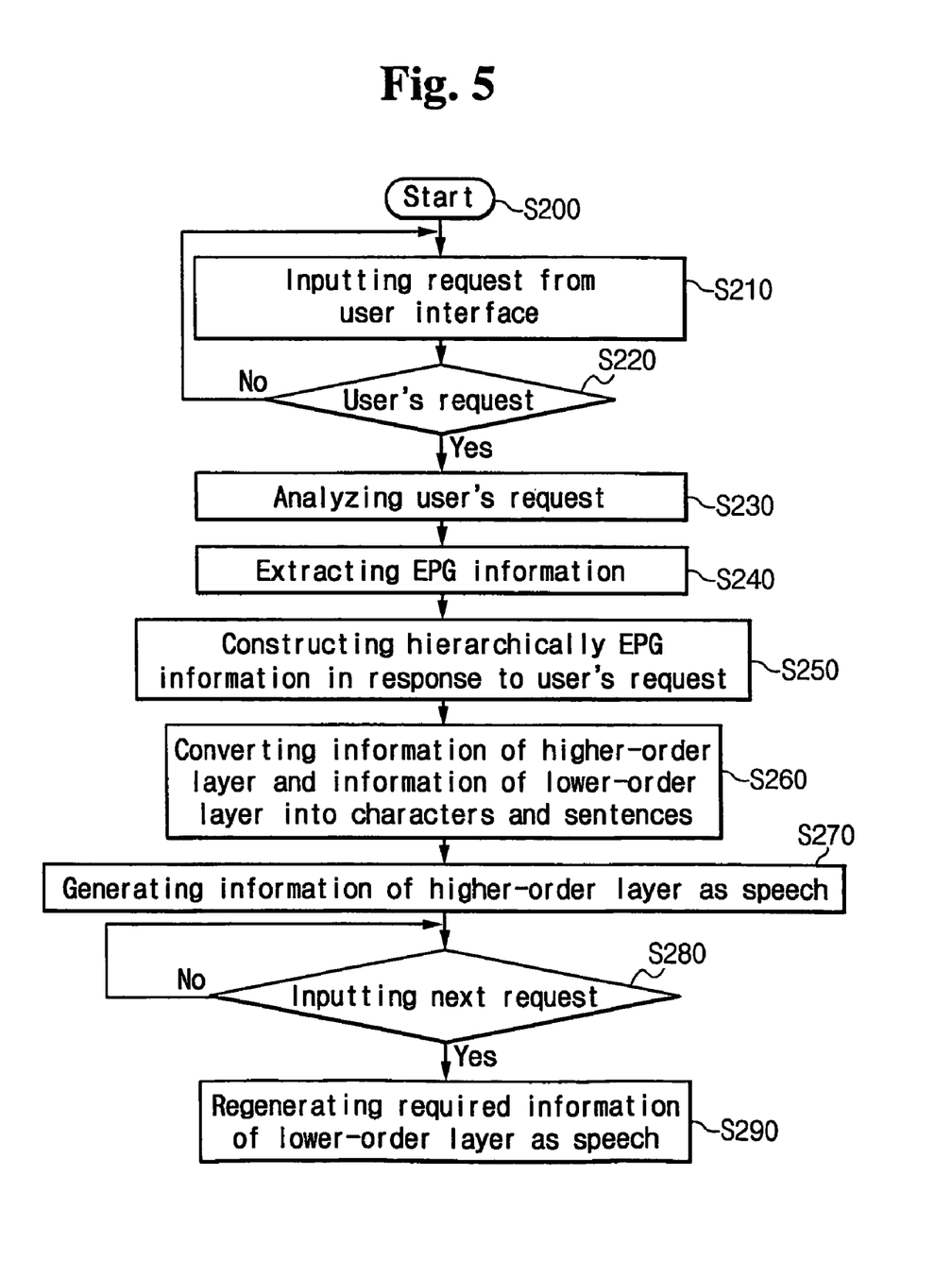
FIG. 5 depicts the control sequence of the EPG processor of FIG. 1.

FIG. 5 depicts the control sequence of the EPG processor 20 of FIG. 1.

If a user's request for receiving the EPG information in speech is input through the user interface 50, the interface 24 supplies this request to the control and command processor 21, and the control and command processor 21 analyzes the user's request (S200 to S220). The control and command processor 21 extracts the required information from the EPG information stored in the storage unit 16 of the service information receiver unit 10 in response to the analyzed request, to produce tailored EPG information that meets the user's request (S230).

The EPG information that meets the user's request includes a program desired by the user, a program of a specific field (e.g. sports programs), and a program being broadcast during a specific period of time.

The produced tailored EPG information is supplied to the EPG text converter 23, and the EPG text converter 23 converts the tailored EPG information into characters under the control of the control and command processor 21 in order to provide the tailored EPG information as speech, and forms sentences in a colloquial style.

In this instance, the EPG processor 20 provides the user with an intellectual guide function to give him the EPG information more conveniently. That is, in order to supply the EPG information to the users more conveniently, the EPG processor 20 constructs the tailored EPG information hierarchically, forms a hierarchically composed guide text, and then guides the EPG information intelligently in response to the user's request. For example, if an EPG information request for a moving picture service is made by a user, the EPG processor 20 receives the request from the user interface 50 to analyze the request, and analyzes the information from the storage unit 16 of the service information receiver unit 10, and only selects channels supplying the moving picture service.

The control and command processor 21 of the EPG processor 20 systematically or hierarchically constructs the information selected to guide users more conveniently (S240). For example, a higher-order layer includes rough information on corresponding programs, and the lower the layers are, the more the information becomes detailed. This information is converted into text through the EPG text converter 23.

In this case, if the conversion is simply made to a combination of characters only, it is inconvenient for the user to listen. In order to solve this problem, the EPG text converter 23 intelligently adds predicative colloquial text and sentences to the converted EPG information to construct the speech 10 EPG information in a colloquial style. Once this action is completed, the EPG text converter 23 transmits the speech EPG information of the uppermost layer to the speech output unit 40 (S250 and S260).

The EPG processor 20 stands by for the next request from the user while the EPG information (the speech EPG information of the uppermost layer) desired by the user is reproduced in speech through the speech output unit 40.

When receiving the user's next request for detailed information on a predetermined channel through the user interface 50, the EPG processor 20 supplies the speech EPG information of the lower-order layers that fulfills the request to the speech output unit 40 to reproduce it as speech (S270 and S280).

The EPG processor 20 may systematically provide the tailored speech EPG that fulfills the user's request through the above procedure.

The above-mentioned hierarchical construction of the EPG information and text conversion procedure will now be described by way of example for full understanding.

Figure 7:
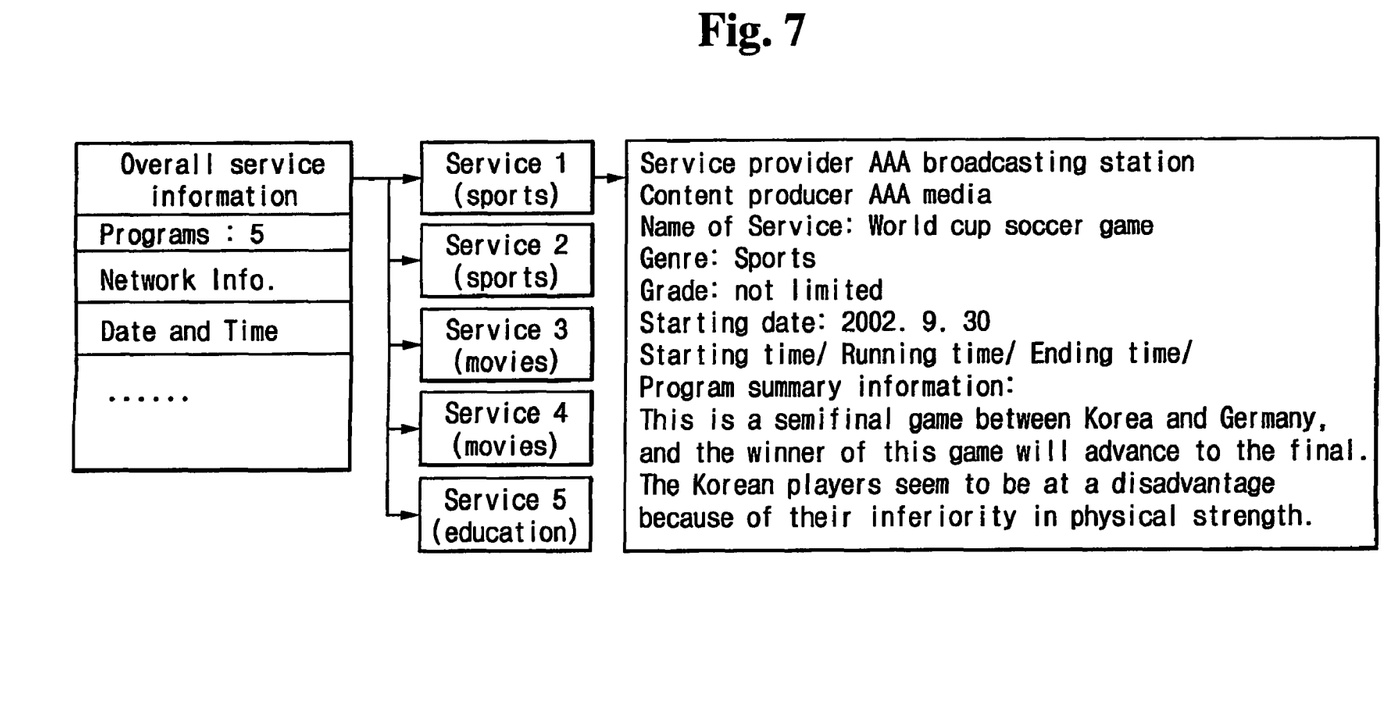
FIG. 7 shows an example of the hierarchical construction of EPG information according to a preferred embodiment of the present invention.

FIG. 7 depicts an example of the hierarchical construction of the EPG information.

The EPG information generally includes simple information on the supplied services. The EPG information corresponds to meta-data for programs or services, and basically provides the following information, as an example.

1. the number of contents provided to supply each programs or services
2. the name of each program or service
3. the producer of each program or service
4. the provider of each program or service
5. the starting time, ending time, and running time for each program or service
6. the genre and grade information of each program or service
7. the summary of each program or service contents (program summary)
8. the current date and time The EPG information including various data may be categorized as a plurality of layers (e.g. three layers), as depicted in FIG. 7. For example, referring to FIG. 7, the uppermost layer supplies the information on the number of programs, and the middle layer supplies the information on programs classified by genre. The lowermost layer provides detailed items about programs (service providers, contents producers, the name of services, grade, starting date, running time, ending time, program summary, etc.) classified by genre.

As described above, when the EPG information is classified into a plurality of layers, the EPG text converter 23 adds the number of programs of the current EPG information to the higher-order layer's text previously stored, to produce the following speech EPG information, i.e. sentences.

<Example> "-five- services are provided in this broadcasting. Do you want information classified by genre?"

Here, the part '- -' indicates that the EPG information of the corresponding layer is converted into characters on the basis of the hierarchical EPG information.

The speech EPG information is reproduced as speech through the speech output unit 40 described hereinafter, and when a user requests information of programs classified by genre, the information corresponding to the middle layer among the classified EPG information is converted into speech EPG information and reproduced as speech, as follows.

<Example> "-two- sports channels, -two- movie channels, and -one- education channel are provided. Which genre would you like?"

When the user selects one genre (e.g. sports), the following speech EPG information, telling through which channel programs included in the selected genre are provided, is produced.

<Example> "Sports are provided on channel -one- and channel -two-. Which channel information would you like?"

When the user selects one channel according to this speech output, e.g. the information corresponding to the lower-order layer among the classified EPG information is converted into the speech EPG information indicating the detailed information of the selected channel, as follows.

<Example> "The name of the program on the channel you would like is -World Cup soccer game-, and the grade is -unlimited-. The game starts at seven a.m. on September thirtieth. Would you like the summary information on this program?"

Detailed facts about the corresponding program are provided on the basis of the EPG information equivalent to the lower-order layer, and when the user requests the summary of the corresponding program, the program summary information included in the lower-order layer is converted into sentences to thereby reproduce the information as speech, as follows.

<Example> "-This is a semifinal game between Korea and Germany, and the winner of this game will advance to the final. The Korean players seem to be at a disadvantage because of their inferiority in physical strength-. Would you like to move to the appropriate channel?"

When the EPG information is converted into text, it is preferable that Arabic numerals or symbols are all converted into characters (e.g. English) in consideration of speech reproduction. In the case that the EPG information is converted into colloquial sentences as in the above example, it is preferable that the EPG information is reproduced as speech by adding sentences for asking for the user's request and for guiding the user-desired information (e.g., "You are moving to the appropriate channel.", "If you would like another channel, please press the EPG button.", etc.) to the information.

As described above, the hierarchical EPG information is converted into text and reproduced as speech so that users may be supplied with the EPG information as speech by stages.

When character and sentence data are applied from the EPG processor 20, the speech output unit 40 performs the following speech reproduction.

Figure 6:
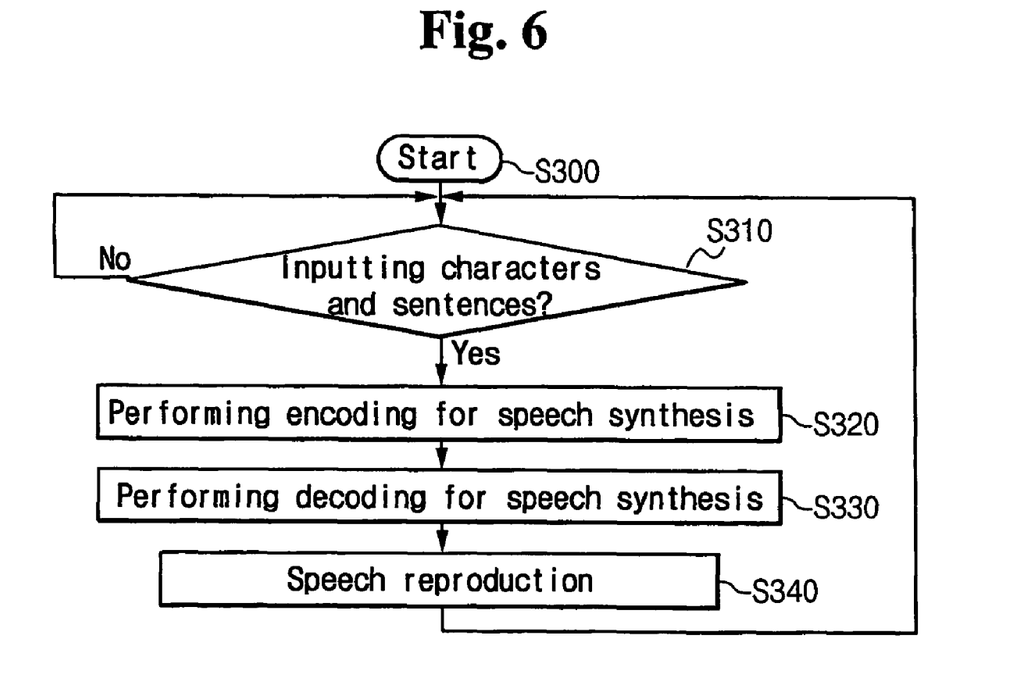
FIG. 6 depicts the control sequence of a speech conversion-reproducing procedure for the EPG processor.

FIG. 6 depicts the control sequence of the speech output unit 40 according to the preferred embodiment of the present invention.

As shown in FIG. 6, the encoder 41 of the speech output unit 40 continuously checks whether or not the speech EPG information, i.e. the character and sentence data, are applied thereto from the EPG processor 20. When the character and sentence data are input along with a series of control signals, the encoder 41 makes the data into codes for speech conversion and outputs them (S300 to S330). The decoder 42 decodes and synthesizes the encoded data to produce speech reproduction signals. The speech reproducer 43 reproduces characters and sentences corresponding to the EPG information as speech in response to the speech reproduction signals (S340).

An MPEG4 Audio Text-to-Speech (M-TTS) may be used as a device for converting characters into speech. In this case, after TTS sentences including the running time, sex, age, speech speed, TTS characters, and prosody information are produced through the input sentences, a bit stream is generated according to M-TTS syntax, and the speech EPG is reproduced through an M-TTS decoder.

The graphic output unit 30 displays the EPG information so that users may be supplied with the EPG information visually and audibly.

The decoder 31 of the graphic output unit 30 decodes the EPG information applied from the EPG processor 20, and the signal generator 32 produces a display signal suitable for digital broadcasting practice in response to the decoded signal. The display signal is displayed as a picture or text equivalent to the EPG information through the display 33.

Accordingly, more exact information transmission can be made through picture output in addition to the speech output. Items guided by speech can be automatically linked to items depicted graphically by the control of the EPG processor, and the speech and the picture can be simultaneously output.

As described above, in the case of providing EPG information that meets a user's request, when he inputs a request through a speech input unit, the EPG processor 20 processes the request dialogically with him through the speech recognition function.

In this dialogic processing, the EPG-providing system responds to the user's request and exercises a command dialogically. That is, after the EPG-providing system analyzes the request of the user's speech command, it basically responds to the request. To confirm the user's request, the EPG-providing system asks an additionally question in return, or searches for the event that is most appropriate to the user's request and supplies it to the user.

In order to do this, the control and command processor 21 of the EPG processor 20 may include a speech recognition and processing function. Since this function is well-known, a detailed description thereof is omitted.

Figure 8:
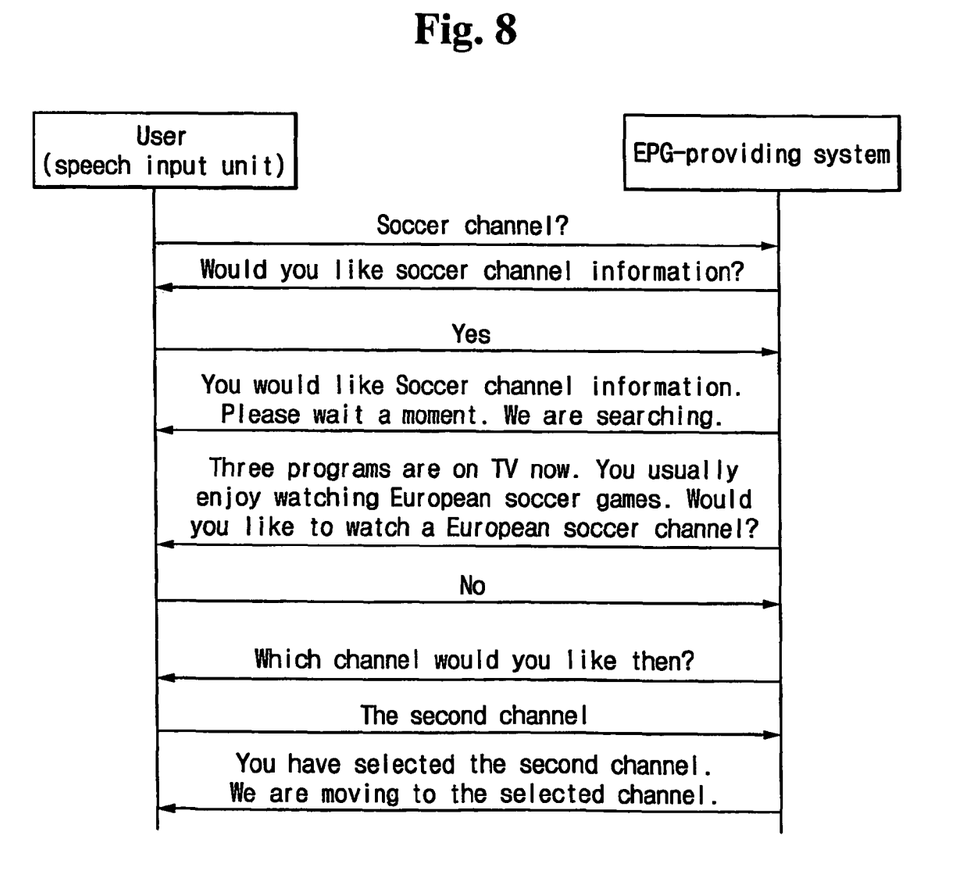
FIG. 8 depicts the control sequence of an EPG-providing system according to another preferred embodiment of the present invention.

As depicted in FIG. 8, when a user's request is input from the user interface 50 as a speech signal, the control and command processor 21 of the EPG processor 20 analyzes an item about which the applied speech signal has asked and generates speech data confirming the user's request to produce it through a speech output unit 40 as speech.

According to the preferred embodiment of the present invention, providing the EPG information as speech can assure safety and convenience to users who are walking or driving, and it allows them to keep walking or driving while listening to the EPG information.

In addition, the present invention can overcome disadvantages of meaningless program information transmission in the case of graphically providing the EPG information to the blind, and it can provide them with meaningful program information transmission through speech. Accordingly, the present invention lets the blind choose desired programs more conveniently.

While the present invention has been described in connection with what is considered to be the preferred embodiments, it is to be understood that the present invention is not limited to the disclosed embodiments, but, on the contrary, is intended to cover various modification and equivalent arrangements included within the spirit and scope of the appended claims.

What is claimed is:

1. A system for providing an electronic program guide (EPG) about a plurality of programs supplied through a digital broadcasting system, comprising:
    a service information receiver unit receiving service information transmitted from the digital broadcasting system and extracting the EPG information from the service information, and storing the EPG information, wherein the EPG information includes sentence fragments corresponding to listings of information about the plurality of programs;
    an EPG processor converting the EPG information stored in the service information receiver unit into speech EPG information, wherein the EPG processor converts the EPG information into characters and forms the same into complete sentences to produce the speech EPG information; and
    a speech output unit producing the speech EPG information as speech, wherein the EPG processor classifies the EPG information for each program into higher-order and lower-order information, respectively converts them into higher-order and lower-order speech EPG information, outputs the higher-order speech EPG information to the speech output unit to reproduce it as speech, and selectively outputs the lower-order speech EPG information to the speech output unit in response to the user's request to reproduce it as speech, wherein the higher-order information is a summary description of a corresponding program and the lower-order information is a more detailed description of the corresponding program.

2. A system according to claim 1, wherein the EPG processor converts the EPG information into colloquial sentences to produce the speech EPG information.

3. A system according to claim 1, further comprising a user interface through which a user's request is input, and the EPG processor analyzes the request, extracts the information matched with the request by the user from among the EPG information stored in the service information receiver unit, and converts the extracted EPG information into speech EPG information.

4. A system according to claim 3, wherein the EPG processor includes:
    a control and command processor extracting the information matched with the user requests from among the EPG information stored in the service information receiver unit to produce tailored EPG information;
    a text converter converting the tailored EPG information into speech EPG information under the control of the control and command processor; and
    an interface providing the user's request, applied through the user interface, to the control and command processor.

5. A system according to claim 3, wherein the EPG processor performs speech recognition by analyzing a user speech signal applied through the user interface and converting the user speech signal into a signal recognizable and to be processed by the EPG processor.

6. A system according to claim 1, wherein the service information receiver unit includes:
    a tuner receiving a digital broadcasting signal transmitted from the digital broadcasting system;
    a demodulator demodulating the digital broadcasting signal applied from the tuner to extract stream information;
    a demultiplexer separating video, audio, data stream, and service information contained in the stream information from each other;
    an EPG generator generating EPG information from he separated service information; and
    a storage unit storing the EPG information.

7. A system according to claim 1, further comprising a graphic output unit displaying the EPG information processed by the EPG processor.

8. A system according to claim 7, wherein the EPG processor links the EPG information output as speech through the speech output unit to the EPG information displayed through the graphic output unit, and controls the speech output unit and the graphic output unit so that the EPG information may be produced as speech simultaneously while being displayed.

9. A method of providing an electronic program guide (EPG) in a system for providing the EPG on a plurality of programs supplied through a digital broadcasting system, comprising:

(a) receiving service information transmitted from the digital broadcasting system, and extracting the EPG information from the service information to store the EPG information, wherein the EPG information includes sentence fragments corresponding to listings of information about the plurality of programs;

(b) analyzing a user's request and extracting EPG information that meets the user's request from the stored EPG information to produce tailored EPG information and classifying the tailored EPG information for each program into higher-order information and lower-order information, wherein the higher-order information is a summary description of a corresponding program and the lower-order information is a more detailed description of the corresponding program;

(c) converting the higher-order information and lower-order information into higher-order speech EPG information and lower-order speech EPG information, respectively, wherein the tailored EPG information is converted into characters and forms the same into complete sentences to produce the speech EPG information; and (d) reproducing the higher-order speech EPG information as speech and selectively reproducing the lower-order speech EPG information as speech in response to the user's request to reproduce the lower-order speech EPG information as speech.

10. A method according to claim 9, wherein the step (c) forms the EPG information into colloquial sentences to produce the speech EPG information.

* * * * *